United States Patent [19]

Tamura

[11] Patent Number: 4,837,470

[45] Date of Patent: Jun. 6, 1989

[54] MAGNETICALLY DRIVEN NUTATING MOTOR

[75] Inventor: Shuichi Tamura, Yokohama, Japan

[73] Assignee: Canon Kabushiki Kaisha, Tokyo, Japan

[21] Appl. No.: 121,113

[22] Filed: Nov. 16, 1987

[30] Foreign Application Priority Data

Nov. 19, 1986 [JP] Japan .................. 61-275750

[51] Int. Cl.$^4$ ............................................. H02K 7/06
[52] U.S. Cl. ................................................... 310/82
[58] Field of Search .......................... 310/49 R, 82, 83

[56] References Cited

U.S. PATENT DOCUMENTS

| Re. 22,549 | 9/1944 | Plensler | 310/82 |
|---|---|---|---|
| 2,871,382 | 1/1959 | Bouvier | 310/82 |
| 3,463,953 | 8/1969 | Maxwell | 310/82 |
| 3,609,422 | 9/1971 | Nordin | 310/82 |
| 3,770,997 | 11/1973 | Presley | 310/82 |
| 3,794,865 | 2/1974 | Guttinger | 310/82 |
| 4,330,725 | 5/1982 | Hintz | 310/82 |
| 4,360,752 | 11/1982 | Morgan | 310/82 |
| 4,634,915 | 1/1987 | Mukoujima et al. | 310/323 |

FOREIGN PATENT DOCUMENTS

166850  9/1950  Fed. Rep. of Germany ........ 310/82

*Primary Examiner*—Mark O. Budd
*Attorney, Agent, or Firm*—Fitzpatrick, Cella, Harper & Scinto

[57] ABSTRACT

A magnetically driven motor includes an output shaft, a magnetic conical plate, a stationary guide, and at least three electromagnets. The output shaft is supported to be rotatable about a predetermined central line. The magnetic conical plate has a vertex on the predetermined central line, is rotatable together with the output shaft about the predetermined central line, is swingably supported to be inclined with respect to the predetermined central line, and has a predetermined peripheral length. The stationary guide has the predetermined central line as an axis, has a vertex angle slightly smaller than a vertex angle of the conical plate, has an annular guide surface corresponding to part of a conical surface of the conical plate, and is adapted such that a peripheral portion of the conical plate is swingable along the guide surface. The guide surface of the stationary guide has a peripheral length larger than that of the conical plate. The electromagnets are equiangularly disposed about the predetermined central line so as to oppose the conical plate and adapted to be sequentially energized. The peripheral portion of the conical plate is swung along the guide surface by a magnetic attraction force acting on the conical plate upon sequential energization of the electromagnets.

11 Claims, 4 Drawing Sheets

MAGNETICALLY DRIVEN NUTATING MOTOR

BACKGROUND OF THE INVENTION

1. Field of the Invention

The present invention relates to a compact magnetically driven motor which utilizes an electromagnetic force and has a high torque.

2. Related Background Art

A conventional motor utilizing an electromagnetic force directly converts the electromagnetic force into rotational torque. The torque is determined by a diameter, a magnetic force, and the like of the motor. If low-speed rotation and a high torque are required, gears or the like must be used to reduce the motor speed. In recent years, there is has been proposed a so-called direct drive motor. However, this motor is bulky and requires high power. In addition, the motor mechanism is complicated. Therefore, the direct drive motor cannot be used for general applications.

SUMMARY OF THE INVENTION

The present invention has been made in consideration of the conventional problems described above, and has as its object to provide a low-speed, compact, magnetically driven motor which can generate a high torque.

The above and other objects, features, and advantages of the present invention will be apparent from the following detailed description of the present invention.

DESCRIPTION OF THE PREFERRED EMBODIMENTS

Figure 1:
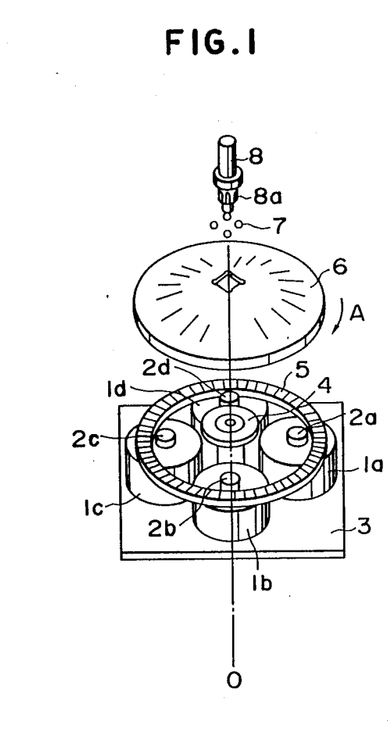
FIGS. 1 and 2 are an exploded perspective view and a sectional view, respectively, showing a magnetically driven motor according to a first embodiment of the present invention.
Figure 2:
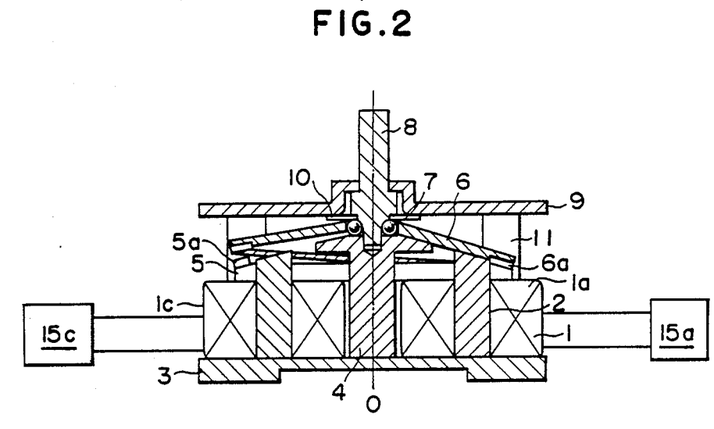

FIG. 1 is an exploded perspective view of a magnetically driven motor according to a first embodiment, and FIG. 2 is a sectional view thereof. The magnetically driven motor includes coils 1a, 1b, 1c, and 1d, iron cores 2a, 2b, 2c, and 2d, a base plate 3, a fixed shaft 4, and a stationary guide 5. The coils 1a, 1b, 1c, and 1d are prepared by winding a copper wire in a cylindrical shape and are driven by electrical signals supplied from drivers 15a, 15b, 15c, and 15d (the drivers 15b and 15d (FIG. 2) are not illustrated), respectively. The coils 1a, 1b, 1c, and 1d have axial holes which respectively receive the cores 2a, 2b, 2c, and 2d. The cores 2a, 2b, 2c, and 2d are fixed on the base plate 3. The fixed shaft 4 serves as a guide for a bearing of an output shaft 8 and a conical plate 6 which is swung and rotated (to be described later) upon driving of the motor. The shaft 4 is fixed on the base plate 3. The cores 2a to 2d, the base plate 3, and the fixed shaft 4 are made of a magnetic material such as soft-iron, while the stationary guide 5 is made of a nonmagnetic material such as a plastic material. A bevel gear is formed on the upper surface of the guide 5. The upper surfaces of the iron cores 2a to 2d, the fixed shaft 4, and the stationary guide 5 are located on a single conical surface having a predetermined vertex angle.

The conical plate 6 is made of a magnetic material such as soft-iron. The conical plate 6 has a bevel gear in a peripheral portion of the lower surface thereof. This bevel gear is meshed with that of the stationary plate. The conical plate 6 has a central hole in which balls 7 are fitted. The lower portion of the output shaft 8 is fitted and guided in the axial hole of the fixed shaft 4 and is rotatable about a central axis O. The output shaft 8 has grooves 8a in which the balls 7 are respectively fitted. The conical plate 6 can be rotated together with the output shaft 8 through the balls 7 about the axis O and can be supported to be inclined with respect to the axis O. The magnetically driven motor further includes a washer 10 for holding the balls 7 and columns 11 for coupling the base plate 3 and an upper plate 9.

The vertex angle of the conical plate 6 is slightly larger than that of a cone defined by the iron cores 2a to 2d, the fixed shaft 4, and the stationary guide 5. For example, the vertex angle of the conical plate 6 is 160°, while the vertex angle defined by the iron cores 2a to 2d, the fixed shaft 4, and the stationary guide 5 is 156°. As a result, when the conical plate 6 is inclined in one of the directions corresponding to the coils 1a to 1d upon energization of the corresponding one of the coils 1a to 1d, the conical plate 6 is attracted by the energized coil, and the bevel gear portion of the stationary guide 5 is meshed with the corresponding bevel gear portion of the conical plate 6. However, the bevel gear portion of the conical plate 6 on the nonattracted side is kept separated from the opposite bevel gear portion of the stationary guide 5. The peripheral bevel gear portion of the conical plate 6 is slightly longer than the corresponding portion of the stationary guide 5. When the vertex angles are defined as described above, the bevel gear of the stationary guide 5 has 80 teeth, while the bevel gear of the conical plate 6 has 81 teeth.

The operation of the magnetically driven motor having the above construction will be described below. When the coil 1a is energized by the driver 15a, a magnetic circuit is formed by the iron core 2a, the base plate 3, the fixed shaft 4, and the conical plate 6. The conical plate 6 is attracted to the iron core 2a but a portion of the conical plate 6 at a position opposite to the iron core 2a is separated from the iron core 2c. In this case, the bevel gear 6a of the conical plate 6 is firmly meshed with the bevel gear 5a of the stationary guide 5 near the iron core 2a but is not meshed with the bevel gear 5a at other portions. The coil 1a is deenergized and at the same time the coil 1b is energized by the driver 15b (not shown). In the same manner as described above, a magnetic circuit is formed by the iron core 2b, the base plate 3, the fixed shaft 4, and the conical plate 6. The conical plate 6 is then attracted to the iron core 2b. Similarly, the coils 1c and 1d are sequentially energized through the drivers 15c and 15d, respectively. As a result, the meshing position of the bevel gears 5a and 5b of the conical plate 6 and the stationary guide 5 is changed in a direction indicated by arrow A, so that the conical plate 6 is swung.

When the vertex angles of the cones are defined as described above, the bevel gear of the stationary guide 5 has 80 teeth, while the bevel gear of the conical plate 6 has 81 teeth. Upon completion of one swinging cycle, the conical plate 6 is rotated about the axis 0 through an angle corresponding to a difference between the number of teeth of the bevel gears. More specifically, when one swinging cycle is completed, the conical plate 6 is rotated a 1/80 revolution in the direction of arrow A. Rotation of the conical plate 6 is transmitted to the output shaft 8 through the balls 7.

By repeating the above operations, the output shaft 8 is continuously rotated. In this case, if the iron cores $2a$ to $2d$ are equidistantly separated by 1 cm from the axis O and an attraction force of the conical plate 6 upon energization of each coil is 100 g, an output torque of $100 \text{ g} \times \sqrt{80} \approx 900$ g·cm can be obtained, provided that frictional forces of gears and the like are neglected. A maximum torque of a conventional motor having the same size (outer diameter: about 400 mm) as that of the motor of this embodiment is about 100 g·cm. Therefore, the motor according to this embodiment can provide a high torque. When the energization order of the coils $1a$, $1b$, $1c$ and $1d$ is reversed, the output shaft 8 is rotated in the reverse direction.

In the above embodiment, the bevel gear of the stationary guide 5 is made of a nonmagnetic material due to the following reason. If both the bevel gears are made of a magnetic material, a frictional force generated by teeth surfaces of the bevel gears is extremely large. In this case, the bevel gear of the conical plate 6 may be made of a nonmagnetic material while the bevel gear of the stationary guide 5 is made of a magnetic material.

Figure 3:
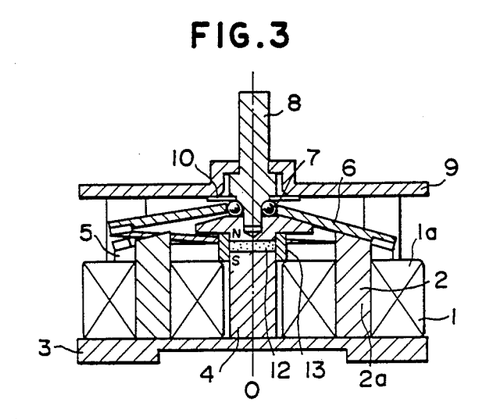
FIG. 3 is a sectional view of a magnetically driven motor according to a second embodiment of the present invention.

FIG. 3 shows a magnetically driven motor according to a second embodiment of the present invention. The motor of the second embodiment is substantially the same as that of the first embodiment, except that a shaft 4 is cut into two shaft portions and a permanent magnet 12 is sandwiched between the two shaft portions. A nonmagmetic member 13 is used to vertically align the shaft portions of the shaft 4 with the permanent magnet 12.

The operation of the second embodiment will be described below. The conical plate 6 is attracted to an indefinite iron core by the magnetic force of the permanent magnet 12, and the output shaft 8 is braked.

A coil $1a$ is energized to form a magnetic circuit by an iron core $2a$, a base plate 3, the fixed shaft 4, the permanent 12, and the conical plate 6. In this case, energization is performed such that the direction of magnetization is the same as that of the permanent magnet 12. Upon formation of the magnetic circuit, the conical plate 6 attracted by the magnetic force of the permanent magnet 12 is attracted to the iron core $2a$. Similarly, when a coil $1b$ is energized, the conical plate 6 is attracted to an iron core $2b$. Subsequently, coils $1c$ and $1d$ are energized to rotate an output shaft 8 in the same manner as in the first embodiment. When energization is stopped, the conical plate 6 is stopped after it is slightly swung by the inertia, and therefore the stop position of the conical plate 6 is indefinite. In addition, the stop position may be changed by post-vibrations or the like. In order to prevent this, the coil may be continuously energized and the output shaft 8 is locked. However, a circuit arrangement for locking the output shaft is undesirably complicated. In addition, a large quantity of energy is required to lock the output shaft 8 for a long period of time.

According to the second embodiment, however, the magnetic force of the permanent magnet 12 acts on the conical plate 6 as soon as the motor is deenergized, thereby maintaining the stop position. The magnetically driven motor according to the second embodiment can be used as a stepping motor.

Figure 4:
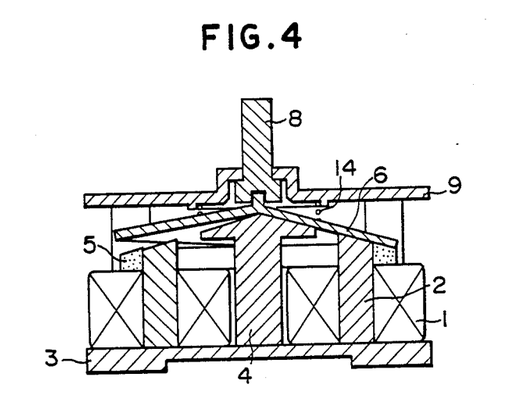
FIG. 4 is a sectional view of a magnetically driven motor according to a third embodiment of the present invention.

FIG. 4 shows a magnetically driven motor according to a third embodiment. In this embodiment, the bevel gears are not used. A stationary guide 5 comprises a friction member made of rubber or the like. A difference between the peripheral lengths of the stationary guide 5 and a conical plate 6 provides a low-speed, high-torque output. The magnetically driven motor of this embodiment is substantially the same as that of the first embodiment, except that the stationary guide 5 does not comprise gears but the friction member made of rubber or the like, that the gear of the conical plate 6 is eliminated and the corresponding surface is constituted by a friction surface, and that a spring 14 is added to set the conical plate 6 in a neutral position during nonenergization. The magnetically driven motor of this embodiment provides a slightly smaller torque than that of the first embodiment. However, an output shaft 8 can be freely rotated during nonenergization.

Figure 5:
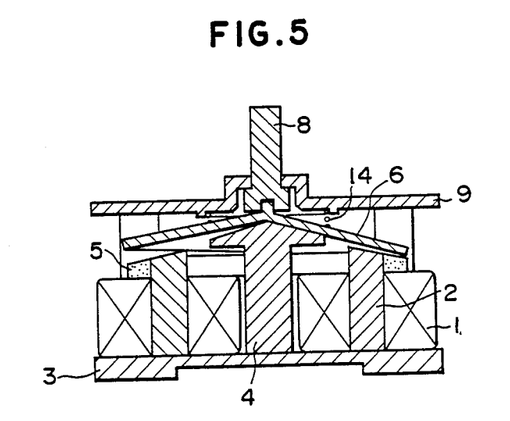
FIG. 5 is a sectional view of a magnetically driven motor according to a fourth embodiment of the present invention.

The magnetically driven motor of the first embodiment generates operating noise while that of the third embodiment does not generate noise. In the first embodiment, however, during attraction of the conical plate to the energized coil, if a gap between the conical plate 6 and the energized iron core is formed, large operating noise is not produced. However, in the third embodiment, the stationary guide 5 is made of rubber and is brought into contact with the rubber conical plate 6. If a gap is formed between the conical plate 6 and the iron core, a low-noise motor can be obtained. This embodiment is shown in FIG. 5.

The stationary guide 5 comprises a friction member having low teeth and is meshed with the conical plate 6 having low teeth. With this arrangement, a low-noise, high-torque motor can be obtained.

In the above embodiments, the number of coils or iron cores is four. However, the number of coils or iron cores may be any number if it is three or more. In an embodiment of FIG. 6, three coils and three iron cores are used.

This embodiment is substantially the same as that of the first embodiment. The same reference numerals as in the first embodiment denote the same parts and functions in the embodiment of FIG. 6, and a detailed description thereof will be omitted.

Figure 6:
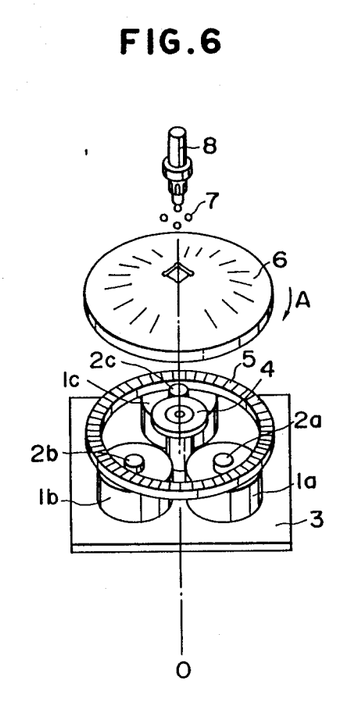
FIG. 6 is a sectional view of a magnetically driven motor according to a fifth embodiment of the present invention; and, FIGS. 7 and 8 are exploded perspective views of magnetically driven motors according to sixth and seventh embodiments of the present invention, respectively.
Figure 7:
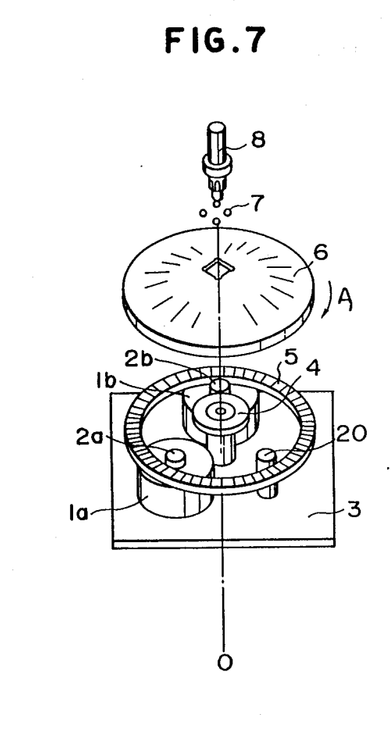

FIG. 7 shows an improvement of the embodiment of FIG. 6. A magnetically driven motor includes two electromagnets and one permanent magnet 20. Each electromagnet comprises two iron cores and two coils.

One end of the permanent magnet 20 is fixed to a base plate 3. The circumferential surface of the permanent magnet 20 is in contact with the inner surface of a stationary guide 5 made of a plastic material. An attraction force of the permanent magnet 20 is smaller than that of each of the electromagnets respectively comprising a coil $1a$ and an iron core $2a$, and a coil $1b$ and an iron core $2b$. Other members in FIG. 7 are the same as those in FIG. 1. The same reference numerals as in FIG. 1 denote the same parts in FIG. 7, and a detailed description thereof will be omitted.

The operation of the embodiment shown in FIG. 7 will be described below.

In the normal state, a conical plate 6 made of a magnetic material is attracted to the permanent magnet 20. In order to rotate an output shaft 8 of the motor in a direction indicated by arrow A, a pulsed current is supplied to the coil 1a to energize the corresponding electromagnet. In this case, the attraction force of the electromagnet for attracting the plate 6 is larger than that of the permanent magnet 20. The conical plate 6 is attracted to the iron core 2a, and at the same time is released from the permanent magnet 20. Upon completion of energization of the coil 1a, a pulsed current is supplied to the coil 1b, and a portion of the conical plate 6 at a position opposite to the iron core 2b is attracted thereto. When energization of the coil 1b completed, neither of the electromagnets generate the magnetic forces for attracting the conical plate 6. The conical plate is kept in the normal state, i.e., attracted to the permanent magnet 20. As described above, when energization cycles of the coils 1a and 1b of the electromagnets are alternately repeated, a bevel gear (not shown) formed on the lower surface of the conical plate 6 is rotatably meshed with the bevel gear of the stationary guide 5 in the same manner as in the first embodiment. Therefore, the conical plate 6 is swung and rotated in a direction indicated by arrow A. In order to rotate the motor in a direction opposite to that indicated by arrow A, the energization order of the electromagnets is reversed.

Figure 8:
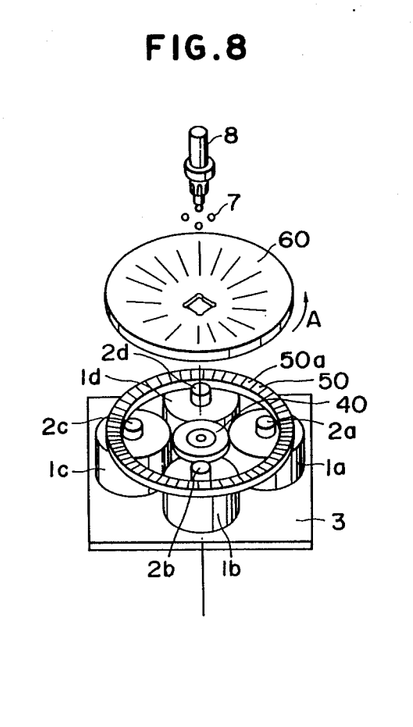

FIG. 8 shows still another embodiment. Unlike the above-mentioned embodiments, a fixed shaft 40 fixed to a base plate 3 is shorter than iron cores of electromagnets which surround the fixed shaft 40. Unlike the above-mentioned embodiments, a tooth portion 50a of a stationary guide 50 has an annular shape in which an upper surface of the guide is inclined downward toward the center. A plate 60 having a bevel gear (not shown) on its peripheral portion has an inverted conical shape. This bevel gear is adapted to mesh with that of the guide 50. In this embodiment, if a vertex angle defined by the stationary guide 50 and the fixed shaft 40 is 160°, a vertex angle of the plate 60 is set to be 156°. If the gear of the stationary guide 50 has 81 teeth, the bevel gear of the plate 60 has a smaller number of teeth (e.g., 80) than that of teeth in the stationary guide 50. When pulsed currents are supplied to the coils 1a to 1d of the electromagnets in the order described in FIGS. 1 to 7, the output shaft 8 is rotated in a direction opposite to that shown in the above-mentioned embodiments. Other elements and the associated operations are the same as those in the above-mentioned embodiment, and a description thereof will be omitted.

According to the present invention as described above, a compact, low-speed, high-torque motor is provided. A compact construction can be obtained in the same manner as in a case wherein a conventional motor is used together with a reduction gear, and the number of components can be greatly reduced. The first embodiment does not use the permanent magnet, the cost of which is most of the cost of the conventional DC motor. Even in the second embodiment, the size of the permanent magnet is smaller than that in the conventional DC motor, thus greatly reducing the total cost when taken into consideration with a decrease in the number of motor components.

Furthermore, in the third embodiment, a clutch means need not be used which is separately required in the conventional structure to perform free rotation during nonenergization with low-speed, high-torque rotation.

What is claimed is:

1. A magnetically driven motor comprising:
   (a) an output shaft supported to be rotatable about a predetermined central line;
   (b) a magnetic conical plate having a vertex on the predetermined central line and a predetermined peripheral length, said plate being rotatable together with said output shaft about the predetermined central line and swingably supported to be inclined with respect to the predetermined central line;
   (c) a stationary guide having the predetermined central line as an axis, having a vertex angle slightly smaller than a vertex angle of said plate and having an annular guide surface corresponding to part of a conical surface of said plate, said guide being adapted such that a peripheral portion of said plate is swingable along said guide surface having a peripheral length larger than that of said plate;
   (d) at least three electromagnets equiangularly disposed about the predetermined central line so as to oppose said conical plate and adapted to be sequentially energized;
   (e) a fixed shaft of magnetic material provided on the inner side of said electromagnets disposed about said predetermined central line, said fixed shaft being formed as a bearing of said output shaft, and provided so as to be in contact with a part of said plate when at least one of said electromagnets is energized and so as to form a part of a magnetic circuit of each said electromagnet; and
   (f) a supporting member of magnetic material adapted to be in contact with each of said electromagnets and said fixed shaft,
   wherein said peripheral portion of said plate is swung along said guide surface by a magnetic attraction force acting on said plate upon sequential energization of said at least three electromagnets.

2. A motor according to claim 1, wherein said peripheral portion of said conical plate and said guide surface are constituted by bevel gears, respectively, which mesh with each other.

3. A motor according to claim 1, wherein said peripheral portion of said conical plate and said guide surface are constituted by friction surfaces, respectively.

4. A magnetically driven motor according to claim 1, wherein said fixed shaft has an inclined portion having an inclination coincident with an inclination of said conical plate.

5. A magnetically driven motor comprising:
   (a) an output shaft supported to be rotatable about a predetermined central line;
   (b) a magnetic conical plate having a vertex on the predetermined central line, rotatable together with said output shaft about the predetermined central line, swingably supported to be inclined with respect to the predetermined central line, and having a predetermined peripheral length;
   (c) a stationary guide having the predetermined central line as an axis, having a vertex angle slightly smaller than a vertex angle of said conical plate, having an annular guide surface corresponding to part of a conical surface of said conical plate, and adapted such that a peripheral portion of said conical plate is swingable along said guide surface, said guide surface of said stationary guide having a peripheral length larger than that of said conical plate, said peripheral portion of said conical plate and said guide surface being constituted by bevel gears, respectively, which mesh with each other;

(d) at least three electromagnets equiangularly disposed about the predetermined central line so as to oppose said conical plate and adapted to be sequentially energized; and (e) a fixed shaft, extending along the predetermined central axis, for supporting said vertex of said conical plate at a vertex thereof, and a permanent magnet interposed between divided portions of said fixed shaft;

wherein said peripheral portion of said conical plate is swung along said guide surface by a magnetic attraction force acting on said conical plate upon sequential energization of said at least three electromagnets.

6. A magnetically driven motor including:

(a) an output shaft supported to be rotatable about a predetermined central line;

(b) a magnetic conical plate having a vertex on the predetermined central line, rotatable together with said output shaft about the predetermined central line, swingably supported to be inclined with respect to the predetermined central line; and having a predetermined peripheral length;

(c) a stationary guide having the predetermined central line as an axis, having a vertex angle slightly smaller than a vertex angle of said conical plate, having an endless guide surface corresponding to part of a conical surface of said conical plate, and adapted such that a peripheral portion of said conical plate is swingable along said guide surface, said guide surface of said stationary guide having a peripheral length larger than that of said conical plate;

(d) a plurality of three electromagnets equiangularly disposed about the predetermined central line so as to oppose said conical plate and adapted to be sequentially energized;

(e) a fixed shaft of magnetic material provided on the inner side of said electromagnets disposed about said predetermined central line, said fixed shaft being formed as a bearing of said output shaft, and provided so as to be in contact with a part of said plate when at least one of said electromagnets is energized and so as to form a part of a magnetic circuit of each said electromagnet; and (f) a supporting member of magnetic material adapted to be in contact with each of said electromagnets and said fixed shaft;

wherein said peripheral portion of said conical plate is swung along said guide surface by a magnetic attraction force acting on said conical plate upon sequential energization of said plurality of three electromagnets.

7. A magnetically driven motor according to claim 6, wherein said fixed shaft has an inclined portion having an inclination coincident with an inclination of said conical plate.

8. A magnetically driven motor including:

(a) an output shaft supported to be rotatable about a predetermined central line;

(b) a magnetic conical plate having a vertex on the predetermined central line, rotatable together with said output shaft about the predetermined central line, swingably supported to be inclined with respect to the predetermined central line, and having a predetermined peripheral length;

(c) a stationary guide having the predetermined central line as an axis, having a vertex angle different from a vertex angle of said conical plate, having an endless guide surface corresponding to part of a conical surface of said conical plate, and adapted such that a peripheral portion of said conical plate is swingable along said guide surface, said guide surface of said stationary guide having a peripheral length different from that of said conical plate;

(d) a plurality of three electromagnets equiangularly disposed about the predetermined central line so as to oppose said conical plate and adapted to be sequentially energized;

(e) a fixed shaft of magnetic material provided on the inner side of said electromagnets disposed about said predetermined central line, said fixed shaft being formed as a bearing of said output shaft, and provided so as to be in contact with a part of said plate when at least one of said electromagnets is energized and so as to form a part of a magnetic circuit of each said electromagnet; and (f) a supporting member of magnetic material adapted to be in contact with each of said electromagnets and said fixed shaft, wherein said peripheral portion of said conical plate is swung along said guide surface by a magnetic attraction force acting on said conical plate upon sequential energization of said plurality of three electromagnets.

9. A magnetically driven motor according to claim 8, wherein said fixed shaft has an inclined portion having an inclination coincident with an inclination of said conical plate.

10. A wobble motor comprising:

(a) an output shaft supported to be rotatable about a predetermined central line;

(b) a magnetic plate having a predetermined peripheral length, said plate being rotatable together with said output shaft about the predetermined central line and swingably supported to be inclined with respect to the predetermined central line;

(c) a stationary guide having the predetermined central line as an axis, having an annular guide surface corresponding to a part of a surface of said plate, said guide being adapted such that a peripheral portion of said plate is swingable along said guide surface having a peripheral length larger than that of said plate;

(d) at least three electromagnets equiangularly disposed about the predetermined central line so as to oppose said plate and adapted to be sequentially energized;

(e) a fixed shaft of magnetic material provided on the inner side of said electromagnets disposed about said predetermined central line, said fixed shaft being formed as a bearing of said output shaft, and provided so as to be in contact with a part of said plate when at least one of said electromagnets is energized and so as to form a part of a magnetic circuit of each said electromagnet; and (f) a supporting member of magnetic material adapted to be in contact with each of said electromagnets and said fixed shaft;

wherein a peripheral portion of said plate is swung along said guide surface by a magnetic attraction force acting on said plate upon sequential energization of said at least three electromagnets.

11. A wobble motor according to claim 10, wherein said magnetic plate includes a conical plate having a vertex on the predetermined central line and said fixed shaft has an inclined portion having an inclination coincident with an inclination of said conical plate.

* * * * *

UNITED STATES PATENT AND TRADEMARK OFFICE
CERTIFICATE OF CORRECTION

PATENT NO. : 4,837,470
DATED : June 6, 1989
INVENTOR(S) : SHUICHI TAMURA

Page 1 of 2

It is certified that error appears in the above-identified patent and that said Letters Patent is hereby corrected as shown below:

AT [56] REFERENCES CITED

Foreign Patent Documents, "166850 9/1950 Fed. Rep. of Germany" should read --166850 9/1950 Austria--.

COLUMN 1

Line 16, "is" should be deleted.
    Line 63, "15d(the" should read --15d(FIG.2)(the-- and "(FIG." should be deleted.
    Line 64, "2)" should be deleted.

COLUMN 3

Line 7, "axis 0" should read --axis O--.
    Line 43, "nonmagmetic member 13" should read --nonmagnetic member 13--.
    Line 52, "permanent 12," should read --permanent magnet 12,--.

COLUMN 5

Line 16, "completed," should read --is completed,--.

COLUMN 7

Line 14, "shaft;" should read --shaft,--.
    Line 27, "line;" should read --line,--.
    Line 53, "shaft;" should read --shaft,--.

UNITED STATES PATENT AND TRADEMARK OFFICE
CERTIFICATE OF CORRECTION

PATENT NO. : 4,837,470

DATED : June 6, 1989

INVENTOR(S) : SHUICHI TAMURA

It is certified that error appears in the above-identified patent and that said Letters Patent is hereby corrected as shown below:

COLUMN 8

Line 66, "shaft;" should read --shaft,--.

Signed and Sealed this

Twenty-second Day of May, 1990

Attest:

HARRY F. MANBECK, JR.

*Attesting Officer*   *Commissioner of Patents and Trademarks*